United States Patent Office 3,705,147
Patented Dec. 5, 1972

1

3,705,147
3-DEAZAPYRIMIDINE NUCLEOSIDES AND
METHOD OF PREPARATION THEREOF
Morris J. Robins, Edmonton, Alberta, Canada, and Bruce
L. Currie, Salt Lake City, Utah, assignors to University
of Utah
No Drawing. Filed Aug. 22, 1969, Ser. No. 862,584
Int. Cl. C07d 51/52
U.S. Cl. 260—211.5                                      7 Claims

ABSTRACT OF THE DISCLOSURE

Novel compounds comprising 3-deazapyrimidine nucleosides were synthesized from 2,4-substituted pyridine compounds by condensation with 2,3,5-tri-O-benzoyl-D-ribofuranosyl bromide, or the chloride thereof, and subsequent modification to yield the desired compounds. These novel nucleosides have the structure

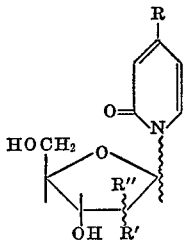

(A)

wherein R is a group selected from the class consisting of hydroxyl and amine and R' and R" are selected from the class consisting of hydrogen and hydroxyl, have been found to inhibit carcinoma growth in animal tissue. In particular, 3-deazacytidine and 3-deazauridine have been found especially effective in inhibiting Ehrlich asceites carcinoma and leukemia L-1210 growth in mice.

The invention described herein was made in the course of work under a grant or award from the Department of Health, Education and Welfare.

Disclosure

The novel compounds of this invention are generically 3-deazapyrimidine nucleosides having the structure

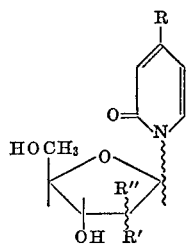

(A)

wherein R is either a hydroxyl or an amine (—NH₂) and R' and R" are either hydroxyl or hydrogen. The compounds of this generic structure have various steric relationships.

Sub-generic groups of these compounds are defined by the following structures:

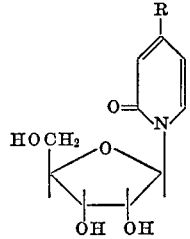

(B)

2

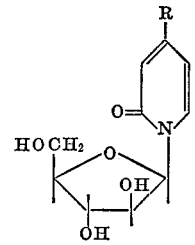

(C)

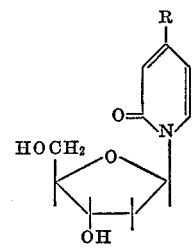

(D)

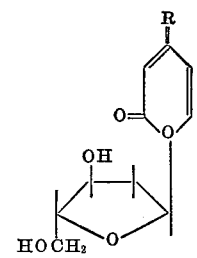

(E)

wherein R is either —OH or —NH₂.

In describing the following compounds a slight departure from conventional nomenclature is made. A capital "B" is used to designate the symbol for beta and a larger capital "D" is used instead of a small capital "D" to indicate the D-line of sodium. A small "a" has been used for alpha. A small "u" is used for the Greek symbol mu.

The compounds defined by Formula B are either 3-deazacytidine or 3-deazauridine, respectively, 4-amino-1-B-D-ribofuranosyl-2-pyridone and 4-hydroxy-1-B-D-ribofuranosyl-2-pyridone.

In Formula C when R is hydroxyl the compound is named 4-hydroxy-1-B-D-arabinofuranosyl-2-pyridone and when R is amine the compound is 4-amino-1-B-D-arabinofuranosyl-2-pyridone or commonly 3-deazacytosine arabinoside.

In Formula D when R is hydroxyl the compound is named 4-hydroxy-1-(2-deoxy-B-D-erythropentofuranosyl)-2-pyridone or, commonly, 2'-deoxy-3-deazauridine and when R is —NH₂ the compound is 4-amino-1-(2-deoxy-B-D-erythropentofuranosyl)-2-pyridone or, commonly, 2'-deoxy-3-deazacytidine.

In Formula E when R is hydroxyl the compound is 4-hydroxy-1-(2-deoxy-a-D-erythro-pentofuranosyl)-2-pyridone and when R is —NH₂ the compound is 4-amino-1-(2-deoxy-a-D-erythro-pentofuranosyl)-2-pyridone.

Methods of preparation

Compounds defined by Formula B can be prepared by condensing a 2,4-substituted pyridine with 2,3,5-tri-O-benzoyl-D-ribofuranosyl bromide to form a compound which upon deblocking forms 3-deazauridine or forms a compound which upon reaction with sodium methoxide forms 3-deazacytidine. If 3-deazauridine is desired then 2,4-bis(trimethylsilyloxy)pyridine can be the starting compound. If 3-deazacytidine is desired then the starting compound can be 4-acetamido-2-methoxypyridine.

In the practice of this invention various known blocking groups can be utilized, including acetyl, benzoyl, toluyl and the like. This listing is not exhaustive, however, of blocking groups useful in this invention.

The compounds defined by Formulas C, D, and E can be formed directly or indirectly from 2,4-substituted pyridine. Specific methods of preparation will be set forth in the examples.

The novel compounds of this invention were found to be effective in inhibiting the growth of *Escherichia coli*, and *Streptococcus faecalis*. Also, distinct inhibition was noted in growth of Ehrlich ascites carcinoma and Leukemia L-1210 cells, both in vitro and in mice.

More specifically, 3-deazauridine (Formula B where R is hydroxyl) can be advantageously formed by condensing 2,4-bis(trimethyl silyloxy)pyridine with 2,3,5-tri-O-benzoyl-D-ribofuranosyl bromide (TBRB) to form 4-hydroxyl-1-(2,3,5-tri-O-benzoyl-B-D-ribofuranosyl)-2-pyridone which was deblocked with ammonia to form the desired compound.

A preferred method of forming 3-deazacytidine (Formula B where R is —NH$_2$) comprises condensing 4-acetamido-2-methoxypyridine with TBRB to yield 4-acetamido-1-(2,3,5-tri-O-benzoyl-B-D-ribofuranosyl)-2-pyridone which, when treated with methanolic sodium methoxide yields the desired compound.

By various treatments of 2,4-bis(trimethylsilyloxy)pyridine various other novel compounds can be formed. For example, fusion with 3,5-di-O-p-toluyl-2-deoxy-D-erythro-pentofuranosyl chloride yielded blocked anomeric deoxynucleosides having structures comparable to Formulas D and E wherein R is a hydroxyl and wherein the hydroxyls on the furan ring were esterified with p-toluyl groups. These deoxynucleosides can be saponified to yield 4-hydroxy-1-(2-deoxy-B-D-erythro-pentofuranosyl)-2-pyridone (Formula D wherein R is —OH) and its alpha anomer 4-hydroxy-1-(2-deoxy-a-D-erythropentofuranosyl)-2-pyridone (Formula E wherein R is —OH).

The amine compounds represented by Formulas D and E can be prepared by the above procedure for the analogous hydroxyl compounds. By substituting 4-acetamido-2-methoxypyridine for 2,4-bis(trimethylsilyloxy)pyridine blocked anomeric deoxynucleosides were formed which could be deblocked, i.e. removal of a toluyl and acetyl groups, to yield 4-amino-1-(2-deoxy-B-D-erythro-pentofuranosyl)-2-pyridone (Formula D wherein R is —NH$_2$), commonly called 2'-deoxy-3-deazacytidine, and its alpha anomer, 4-amino-1-(2-deoxy-a-D-erythro-pentofuranosyl)-2-pyridone (Formula 5 wherein R is —NH$_2$).

Another novel compound represented by Formula C wherein R is —NH$_2$ can be formed by condensing 4-acetamido-2-methoxypyridine with 2,3,5-tri-O-benzoyl-D-arabinofuranosyl chloride to yield a blocked nucleoside of the structure

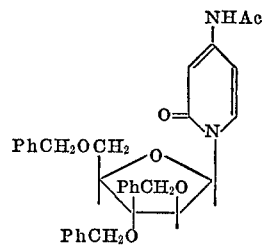

wherein Ac and Ph are, respectively, acetyl and phenyl groups. Treatment of this compound with a base and hydrogenolyzing yielded 4-amino-1-B-D-arabinofuranosyl-2-pyridone, commonly named 3'-deazacytosine arabinoside.

The analog of this compound, i.e., the compound of Formula C wherein R is —OH, can be formed by treating 3-deazauridine with diphenyl carbonate to form 2-hydroxy-1-B-D-arabinofuranosyl-4-pyridone-O$_2$→2'-cyclonucleoside.

The reactions described above are illustrated graphically as follows:

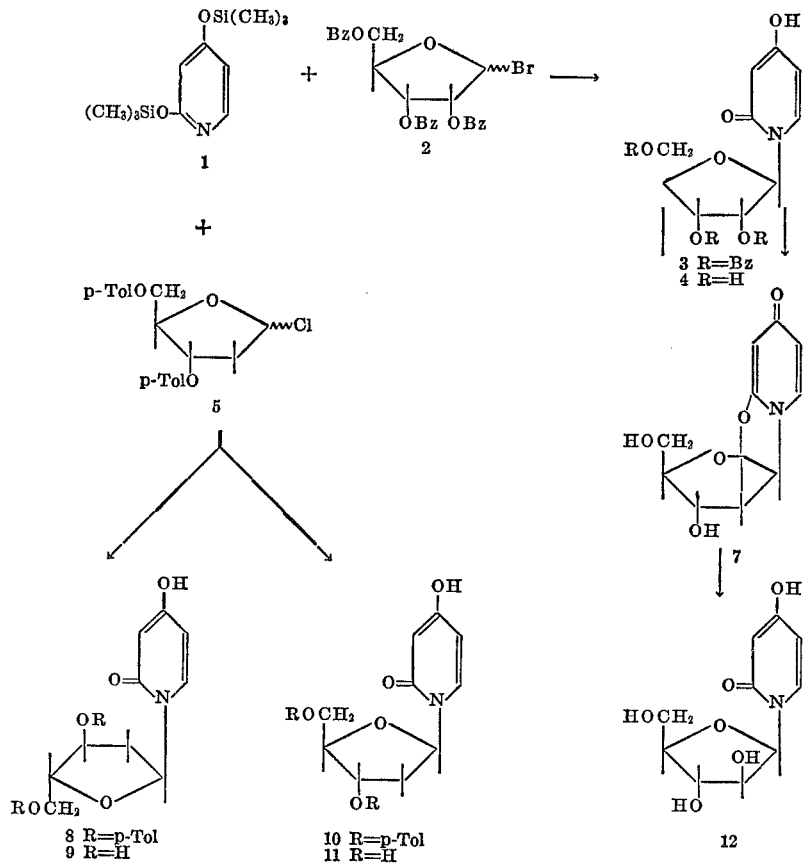

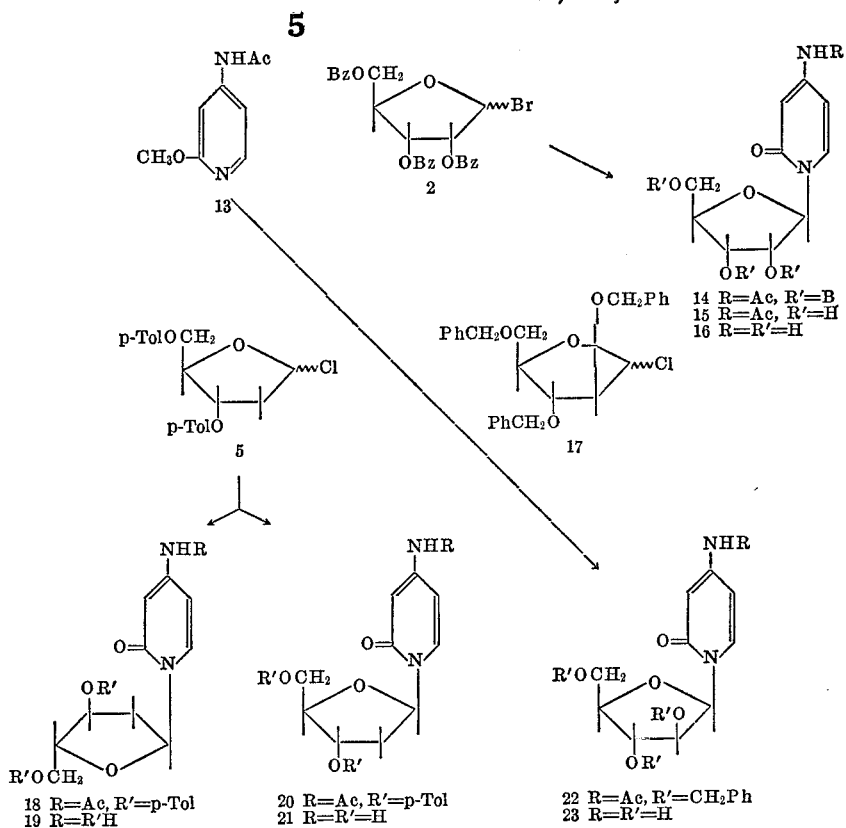

Although the above compounds are identified elsewhere, for convenience the name of each compound represented by the above structural formula is set forth below:

(1) 2,4-bis(trimethylsilyloxy) pyridine
(2) 2,3,5-tri-O-benzoyl-D-ribofuranosyl bromide
(3) 4-hydroxy-1-(2,3,5-tri-O-benzoyl-B-D-ribofuranosyl)-2-pyridone
(4) 4-hydroxy-1-B-D-ribofuranosyl-2-pyridone, or 3-deazauridine
(5) 3,5-di-O-p-toluyl-2-deoxy-D-erythro-pentofuranosyl chloride
(7) 2-hydroxy-1-B-D-arabinofuranosyl-4-pyridone-$O_2$-2'-cyclonucleoside
(8) 4-hydroxy-1-(3,5-di-O-p-toluyl-2-deoxy-a-D-erythro-pentofuranosyl)-2-pyridone
(9) 4-hydroxy-1-(2-deoxy-a-D-erythro-pentofuranosyl)-2-pyridone
(10) 4-hydroxy-1-(3,5-di-O-p-toluyl-2-deoxy-B-D-erythro-pentofuranosyl)-2-pyridone
(11) 4-hydroxy-1-(2-deoxy-B-D-erythro-pentofuranosyl)-2-pyridone or 2'-deoxy-3-deazauridine
(12) 4-hydroxy-1-B-D-arabinofuranosyl-2-pyridone or 3-deazauracil arabinoside
(13) 4-acetamido-2-methoxypyridine
(14) 4-acetamido-1-(2,3,5-tri-O-benzoyl-B-D-ribofuranosyl)-2-pyridone
(15) 4-acetamido-1-B-D-ribofuranosyl)-2-pyridone
(16) 4-amino-1-B-D-ribofuranosyl-2-pyridone or 3-deazacytidine
(17) 2,3,5-tri-O-benzoyl-D-arabinofuranosyl chloride
(18) 4-acetamido-1-(3,5-di-O-p-toluyl-2-deoxy-a-D-erythro-pentofuranosyl)-2-pyridone
(19) 4-amino-1-(2-deoxy-a-D-erythro-pentofuranosyl)-2-pyridone
(20) 4-acetamido-1-(3,5-di-O-p-toluyl-2-deoxy-B-D-erythro-pentofuranosyl)-2-pyridone
(21) 4-amino-1-(2-deoxy-B-D-erythro-pentofuranosyl)-2-pyridone
(22) 4-acetamido-1-(2,3,5-tri-O-benzoyl-B-D-arabinofuranosyl)-2-pyridone
(23) 4-amino-1-B-D-arabinofuranosyl-2-pyridone or 3-deazacytosine arabinoside

EXAMPLE I

Preparation of 3-deazauridine
4-hydroxy-1-B-D-ribofuranosyl-2-pyridone

The preparation of 3-deazauridine required the synthesis of the following reactants.

2,4-bis(trimethylsilyloxy)pyridine (1) — A suspension of 50 g. (0.45 mole) powdered 2,4-dihydroxypyridine in 80 ml. of toluene was refluxed until no further water was collected in a Dean-Stark trap. The toluene was then removed by distillation and 75 ml. of hexamethyldisilazane was added. This suspension was refluxed with stirring while protected from moisture in an oil bath at 140–150° until complete solution was effected (about 3 hrs.). An additional 20 ml. of hexamethyldisilazane was added and the solution was heated for an additional 0.5 hr. A distillation head was attached and hexamethyldisilazane plus toluene was removed at boiling point 60–65° C./22 mm. Hg (bath temperature 110°). The 2,4-bis-(trimethylsilyloxy)-pyridine (1) (98 g., 86%) distilled at boiling point 127–128° C./20 mm. Hg (bath temperature 155°), UV max. (absolute-p-dioxane) 262 mu ($\epsilon$ 2190) UV min. 241 mu ($\epsilon$ 690) (see Table 1 for ultraviolet data on 2,4-dimethoxypyridine). A sample (0.255 g., 0.001 mole) of 1 was dissolved in absolute dioxane and hydrolyzed with 4 drops of $H_2O$ to give 0.104 g. (93.7%) 2,4-dihydroxypyridine thus establishing the presence of two trimethylsilyl substituents.

4-hydroxy-1-(2,3,5-tri - O - benzoyl - B-D - ribofuranosyl)-2-pyridone (3)—To a solution of 2,3,5-tri-O-benzoyl-D-ribofuranosyl bromide (2) [prepared from 10.1 g. (0.02 mole) of 1-O-acetyl-2,3,5-tri - O - benzoyl-D-ribofuranose] in 200 ml. of dry acetonitrile was added 5.1 g. (0.02 mole) of 1. The solution was protected from moisture and allowed to stand for 8 days at room temperature and then was evaporated. The residue was treated with 70 ml. of 85% aqueous ethyl alcohol and boiled on a steam bath for 5 min. This solution was evaporated to dryness and the resulting dark solid foam was dissolved in 30 ml. of chloroform and applied to a column (2 in diameter 700 g.) of neutral alumina. The column was washed with 3000 ml. of chloroform followed by 3000 ml. of ethyl acetate and these washes containing sugar were discarded. Elution was begun with ethyl acetate-n-propyl alcohol-water (4:1:2) (upper phase) and the second 500 ml. portion was evaporated to yield 7.7 g. (68%) of 3. Recrystallization of 3 from ethanol-water mixture gave crystals, melting point of 140–141° C.

*Analysis.*—Calcd. for $C_{31}H_{25}NO_9 \cdot 0.75H_2O$ (percent): C, 65.43; H, 4.69; N, 2.46. Found (percent): C, 65.50; H, 4.66; N, 2.48.

The above reactants were then utilized to form:

4-hydroxy - 1-B-D - ribofuranosyl - 2 - pyridone(3-deazauridine) (4)—To 100 ml. of methanol presaturated with $NH_3$ at $-10°$ was added 1.0 g. (0.0018 mole) of 3. The mixture was sealed and allowed to stand for 6 days at room temperature. The resulting solution was evaporated and the residue was triturated thoroughly with dry ethyl ether to give 0.41 g. (88%) of 4. Recrystallization of this material from methanol acetone gave 0.30 g. (64%) of pure 4, melting point of 228–230° C.;

$[\alpha]_D^{27} + 35.3°$ (c. 1, $H_2O$); UV max. (pH 1) 278 mu ($\epsilon$ 4260), (pH 11) 255 mu ($\epsilon$ 8270) 268 mu sh. ($\epsilon$ 6440), methanol 282 mu ($\epsilon$ 4620); NMR deuterated dimethyl sulfoxide $\delta$ 5.98 (d, 1, $J_{1'-2'}=2.5$ Hz., $H_{1'}$), 5.58 (d, 1, $J_{3-5}=2.5$ Hz., $H_3$), 5.95 ("q," 1, $J_{5-3}=2.5$ Hz., $J_{5-6}=7.5$ Hz., $H_5$), 7.77 (d, 1, $J_{6-5}=7.5$ Hz., $H_6$). Addition of $D_2O$ caused the peak at 5.58 ($H_3$) to disappear with corresponding collapse of the peak at $\delta$ 5.95 ($H_5$) to a doublet with $J_{5-6}=7.5$ Hz.

*Analysis.*—Calcd. for $C_{10}H_{13}NO_6$ (percent): C, 49.38; H, 5.39; N, 5.76. Found (percent): C, 49.18; H, 5.34; N, 5.60.

EXAMPLE II

Preparation of 3-deazacytidine or 4-amino-1-B-D-ribofuranosyl 2-pyridone

Synthesis of 3-deazacytidine was accomplished in the following manner. Preparation of 4-acetamido-1(2-3,5-tri-O-benzoyl-B-D-ribofuranosyl) - 2 - pyridone (14) an intermediate was accomplished. To a solution of 2 [prepared from 5.66 g. (0.0112 mole) of 1-O-acetyl-2,3,5-tri-O-benzoyl-D-ribofuranose] in 55 ml. of dry acetonitrile was added 1.86 g. (0.0112 mole) of 4-acetamido-2-methoxypyridine (13). The resulting solution was sealed, allowed to stand for 49 hours at room temperature, evaporated to dryness, and the residue was coevaporated with 100 ml. of chloroform. The resulting solid foam was dissolved in 30 ml. of chloroform and poured slowly into 270 ml. of ethyl ether with vigorous stirring. The mixture was refrigerated for 15 hrs. and 5.61 g. plus 0.54 g. second crop (6.15 g. 92%) of crystalline 14 was collected. Recrystallization of a small sample of this material from chloroform and ethyl ether gave crystals of 14, melting point 208–209° C.

*Analysis.*—Calcd. for $C_{33}H_{28}N_2O_9$ (percent): C, 66.43; H, 4.73; N, 4.70. Found (percent): C, 66.30; H, 4.81; N, 4.47.

A second intermediate involved preparation of 4-acetamido-1-B-D-ribofuranosyl - 2 - pyridone (15): To 200 ml. of methanol presaturated with $NH_3$ at $-10°$ C. was added 2.17 g. (0.00364 mole) of 14. The mixture was sealed, allowed to stand for 5 days at room temperature, evaporated to dryness, and the residue was triturated thoroughly with dry ethyl ether to yield 1.03 g. (100%) of crystalline 15. A small sample of this material was recrystallized from methanol-acetone to give crystals of 15, melting point of 164–165° C.; UV max. (pH 1) 297; 257 mu ($\epsilon$ 4,100; 14,900), (pH 11), 297; 255 mu ($\epsilon$ 4,600; 14,400) methanol 300; 255 mu ($\epsilon$ 4,100; 13,200); NMR (dimethylsulfoxide) $\delta$ 2.07 (s., 3,4-NHCOCH$_3$), 6.78 (d, 1, $J_{1'-2'}=2.0$ Hz., $H_{1'}$).

*Analysis.*—Calcd. for $C_{12}H_{16}N_2O_6 \cdot H_2O$ (percent): C, 47.68; H, 6.00; N, 9.27. Found (percent): C, 47.84; H, 5.97; N, 9.60.

The above were then used to prepare 4-amino-1-B-D-ribofuranosyl-2-pyridone (3-deazacytidine) (16). Method A—A solution of 2.43 g. (0.00855 mole) of 15 in 150 ml. of 0.1 normal NaOH was refluxed for 30 min. cooled in an ice bath, neutralized to pH 7 with 1 normal HCl, evaporated to dryness, and coevaporated with two 50 ml. portions of methanol. The resulting solid was extracted with hot methanol and this mixture was filtered using a Celite bed to remove NaCl. The filtrate was evaporated and the residue was dissolved in 5 ml. of 30% aqueous methanol and applied to a column (1 in. diameter, 100 ml.) of Dowex 1–X2 (OH—) (200–400 mesh) packed in the same solvent, which was also used for elution. Fractions (4 ml.) 161 to 280 were pooled and evaporated to yield 1.62 g. (78%) of a solid foam which was homogeneous [TLC, upper phase ethyl acetate:n-propyl alcohol: water (4:12)]. Recrystallization of this material from methanol-ethyl ether gave needles of 16; melting point 208.5–210° C. $[\alpha]_D^{29} + 4.6°$ (c. 1, $H_2O$); UV max. (pH 1) 258.5 mu ($\epsilon$ 15,500), (pH 11) 258.5 mu ($\epsilon$ 8840) 275 mu sh. ($\epsilon$ 6780), methanol 260.5 mu ($\epsilon$ 8230) 275 mu sh. ($\epsilon$ 6300); NMR dimethylsulfoxide $\delta$ 6.12 (s., 2,4-NH$_2$), 5.95 (d, 1, $J_{1'-2}=3.5$ Hz., $H_{1'}$), 5.25 d, 1, $J_{3-5}=2.5$ Hz., $H_3$), 5.76 ("q," 1, $J_{5-3}=2.5$ Hz., $J_{5-6}=7.5$ Hz., $H_5$), 7.52 (d, 1., $J_{6-5}=7.5$ Mz., $H_6$).

*Analysis.*—Calcd. for $C_{10}H_{14}N_2O_5$ (percent): C, 49.58; H, 5.82; N, 11.57. Found (percent): C, 49.39; H, 6.03; N, 11.33.

Method B.—A solution of 7.4 g. (0.137 mole) of sodium methoxide and 7.4 g. (0.0124 mole) of 14 in 1000 ml. of dry methanol was refluxed for 2.5 hrs. while protected from moisture. The solution was then cooled to $-10°$ C. neutralized to pH$\cong$7 with conc. HCl, and evaporated to dryness. The residue was treated with 200 ml. of $H_2O$ and extracted with four 150 ml. portions of ethyl ether. The aqueous layer was evaporated and the residue was extracted with 400 ml. absolute ethanol and filtered using a celite bed. The filtrate was evaporated and the residue was dissolved in 20 ml. of 30% aqueous methanol and chromatographed on a column (1 in. diameter, 200 ml.) of Dowex 1–X2 (OH$^-$) as in Method A. Yield 1.48 g. (49%) of crystalline 16, melting point 207–209° C. which was identical in all respects to the product from Method A.

EXAMPLE III

Preparation of 4-hydroxy-1-(2-deoxy-B-D-erythropentofuranosyl)-2-pyridone, commonly called 2' - deoxy - 3-deazauridine Synthesis of the above compound was accomplished by first preparing 4-hydroxy-1-(3,5-di-O-p-toluyl-2-deoxy-a-D-erythro-pentofuranosyl-2-pyridone (8) and 4-hydroxy-1 - (3,5 - di - O-p-toluyl-2-deoxy-B-D-erythropentofuranosyl)-2-pyridone (10). A well stirred mixture of 4.63 g. (0.012 mole) of crystalline 3,5-di-O-p-toluyl-2-deoxy-D-erythro-pentofuranosyl chloride (5) and 3.05 g. (0.012 mole) of 1 was fused for 30 min. at 110° in vacuo by use of an aspirator. The light brown melt was treated with moist dichloromethane and unreacted 2,4-dihydroxypyridine (0.42 g.) was removed by filtration. The filtrate was evaporated to dryness and the residue dissolved in warm ethylacetate. Three crops of crystals [2.37 g., 62% based on nonrecovered (1)] were obtained which contained both anomers 8 and 10. The total crystalline material was mixed with 10 g. of silica gel and 20 ml. of acetone and the mixture was evaporated to dryness and packed on top of a dry packed column (1 in. diameter, 140 g.) of silica gel. The column was washed with 1000 ml. of benzene, 1000 ml. of benzene-ethylacetate (8:2), and then was eluted with benzene-ethyl acetate (6:4). The appropriate fractions (as determined by TLC, $R_{10}/R_8$ 1.3) were pooled and evaporated and the residue recrystallized from benzene-ethyl acetate. Early fractions contained pure beta anomer 10 (0.20 g., 5.3% based on nonrecovered 1), melting point of 218.5–219° C.

*Analysis.*—Calcd. for $C_{26}H_{25}NO_7$ (percent): C, 67.38; H, 5.44; N, 3.02. Found (percent): C, 67.54; H, 5.47; N, 3.01. Middle fractions contained both anomers [0.51 g., 13.4% based on nonrecovered (1)]. Later fractions contained pure alpha anomer 8 (0.51 g., 13.4%), melting point 185–189° C.

*Analysis.*—Found (percent): C, 67.21; H, 5.43; N, 3.08.

From the above compounds, the following technique was used to prepare 4-hydroxy-1-(2-deoxy-B-D-erythro-pentofuranosyl) - 2 - pyridone (2'deoxy-3-deazauridine) (11): To 100 ml. of methanol previously saturated with $NH_3$ at −10° was added 0.19 g. (0.00041 mole) of 10 and the mixture was sealed and allowed to stand for 5 days at room temperature. The resulting solution was evaporated and the residue was triturated thoroughly in dry ethyl ether and then recrystallized from methanol-ethyl ether to yield 0.075 g. (80%) of pure 11, melting point 196–198°; $[\alpha]_D^{28}$ +61.5° (c. 1, $H_2O$); UV max. (pH 1) 278 mu ($\epsilon$ 3820), (pH 11) 256 mu ($\epsilon$ 7590) 268 mu sh. ($\epsilon$ 6120), ($H_2O$) 276 mu ($\epsilon$ 4920); NMR ($D_2O$) $\delta$ 6.33 ("t," l, $J_{1'-2'2''}$=6.5 Hz. $H_{1'}$).

*Analysis.*—Calcd. for $C_{10}H_{13}NO_5$ (percent): C, 52.86; H, 5.77; N, 6.17. Found (percent): C, 52.58; H, 5.65; N, 6.04.

EXAMPLE IV

Preparation of 4 - hydroxy - 1 - (2-deoxy-a-D-erythro-pentofuranosyl - 2 - pyridone (9).—A 0.42 g. (0.00090 mole) sample of 8 was treated exactly as in the preparation of 11 above to yield 0.13 g. (64%) of 9, melting point of 174–176° C.; $[\alpha]_D^{28}$ −41.7° (c. 1.1, $H_2O$); UV max. (pH 1) 278 mu ($\epsilon$ 3310), (pH 11) 254 mu ($\epsilon$ 7360) 268 mu sh. ($\epsilon$ 5900), $H_2O$) 276 mu ($\epsilon$ 4420); NMR ($D_2O$) $\delta$ 6.1 ("q," l, $J_{1'-2', 2''}$=2.5 and 7.5 Hz., $H_{1'}$).

*Analysis.*—Calcd. for $C_{10}H_{13}NO_5$ (percent): C, 52.86; H, 5.77; N, 6.17. Found (percent): C, 52.86; H, 5.72; N, 5.97.

EXAMPLE V

The preparation of 4-amino-1-(2-deoxy-B-D-erythro-pentofuranosyl)-2-pyridone, commonly called-2'-deoxy-3-deazacytidine, was accomplished by first preparing 4-acetamido - 1 - (3,5 - di-O-p-toluyl-2-deoxy-B-D-erythro-pentofuranosyl)-2-pyridone (20) and 4-acetamido-1-(3,5-di - O - p - toluyl-2-deoxy-a-D-erythro-pentofuranosyl)-2-pyridine (18).—A well stirred mixture of 2.0 g. (0.012 mole) of 13 and 4.6 g. (0.012 mole) of 5 was fused for 1 hr. at 110° in vacuo (aspirator). The resulting light brown melt was treated with 50 ml. of ethyl acetate-ethanol (1:1) and the insoluble material was removed by filtration. The filtrate was evaporated and the residue was dissolved in 10 milliliters and applied to a dry packed column (1 X 23 in.) of silica gel. The column was washed with 1500 ml. of chloroform and elution was begun with chloroform-acetone (9:1). Fractions (100 ml.) 11 to 14 were pooled and evaporated to yield 0.15 g. of the B anomer 20 which was crystallized from ethyl acetate-benzene to give needles of 20, melting point of 201.5–203.5° C.

*Analysis.*—Calcd. for $C_{28}H_{28}N_2O_7$ (percent): C, 66.66; H, 5.59; N, 5.55. Found (percent): C, 66.57; H, 5.45; N, 5.49.

Fractions 15 to 35 were pooled and evaporated to yield 1.41 grams of an anomeric mixture of 20 and 18. Fractions 36 to 41 were pooled and evaporated to yield 1.41 grams of an anomeric mixture of 20 and 18. Fractions 36 to 41 were pooled and evaporated to yield 0.20 gram of 18 which was crystallized from ethyl acetate-benzene to give crystals of 18, melting point 192–194° C.

*Analysis.*—Calcd. for $C_{28}H_{28}N_2O_7 \cdot 1.5H_2O$ (percent): C, 63.30; H, 5.87; N, 5.27. Found (percent): C, 63.52; H, 5.74; N, 4.96. Total yield of 20 plus 18: 1.76 g. (29%).

From the above compounds, the following technique was used to prepare 2'-deoxy-3-deazacytidine-4-amino-1-(2-deoxy-B-D-erythro-pentofuranosyl)-2-pyridone (21).—A mixture of 1.27 g. (0.00252 mole) of an anomeric mixture (mainly 20 by TLC) of 20 and 18 in 250 ml. of methanol containing 1.27 g. of sodium methoxide was refluxed for 2.5 hrs. with stirring. The yellow solution was neutralized with 10 ml. of Dowex 50W–X12 (H+) resin after cooling to room temperature. This mixture was filtered, the filtrate evaporated, the residue treated with 30 ml. of $H_2O$ and extracted with three 30 ml. portions of ethyl ether. The aqueous layer was evaporated and the residue dissolved in 3 ml. of $H_2O$ and applied to a column (2 cm. diameter, 90 ml.) of Dowex 1–X2 (OH). The column was eluted with $H_2O$ and 2 ml. fractions were collected. Fractions 148 to 200 were pooled and evaporated and the residue was crystallized from ethanol-acetone-chloroform to give 0.14 g. (25%) of crystalline 21, melting point 193–194° C.; $[\alpha]_D^{28}$ +39.8° (c. 1, $H_2O$); UV max. (pH 1) 258 mu ($\epsilon$ 14,400), (pH 11) 259 mu ($\epsilon$ 8670) 275 mu sh. ($\epsilon$ 6700), ($H_2O$) 260 mu ($\epsilon$ 9000) 275 mu sh. ($\epsilon$ 6800); NMR ($D_2O$) $\delta$ 6.42 ("t," l, $J_{1'-2',2''}$=6.7 Hz., $H_{1'}$).

*Analysis.*—Calcd. for $C_{10}H_{14}N_2O_4$ (percent): C, 53.09; H, 6.24; N, 12.38. Found (percent): C, 53.07; H, 6.02; N, 12.52.

EXAMPLE VI

A procedure identical to Example V was used to prepare the alpha anomer, 4-amino-1-(2-deoxy-a-D-erythro-pentofuranosyl)-2-pyridone (19). A solution of 0.62 g. (0.0012 mole) of 18 in 150 ml. of methanol containing 0.62 gram of sodium methoxide was treated analogously to the preparation of 21 above. Fractions 99 to 130 were pooled and evaporated to give 0.12 g. (43%) of 19 as a white solid foam. This chromatographically homogeneous [TLC $R_{21}/R_{19}$=1.3 using upper phase ethyl acetate-n-propanol-$H_2O$ (4:1:2)] product was not obtained in crystalline form. $[a]_D^{28}$ −16.1° (c. 1.1, $H_2O$); UV max. (pH 1) 258 mu ($\epsilon$ 14,000), (pH 11) 259 mu ($\epsilon$ 7370) 275 mu sh. ($\epsilon$ 5710), ($H_2O$) 259 mu ($\epsilon$ 7050) 275 mu sh. ($\epsilon$ 5390); NMR ($D_2O$) $\delta$ 6.28 ("q," l, $J_{1'-2', 2''}$=3.8 and 7.2 Hz., $H_{1'}$.

*Analysis.*—Calcd. for $C_{10}H_{14}N_2O_4$ (percent): C, 53.09; H, 6.24; N, 12.38. Found (percent): C, 52.90; H, 6.27; N, 12.11.

EXAMPLE VII

Preparation of 4-hydroxy-1-B-D-arabinofuranosyl-2-pyridine was accomplished by reacting 3-deazauridine with diphenyl carbonate to form 2-hydroxy-1-B-D-arabinofuranosyl-4-pyridone-$O_2 \rightarrow 2'$-cyclonucleoside (7). To a solution of 0.77 gram (0.0032 mole) of 4 in 3.1 ml. of dry DMF was added 0.88 gram (0.0041 mole) of diphenylcarbonate and 0.015 gram (0.00018 mole) of $NaHCO_3$. The mixture was heated with stirring for 22 minutes in an oil bath at 150° C. The resulting brown solution was cooled to 60° and then poured into 60 milliliters of ethyl ether with vigorous stirring. The tan solid which separated was triturated with three 25 ml. portions of ethyl ether and then recrystallized from methanol acetone to yield 0.59 gram (82%) of white needles of 7; melting point of 218–220° C.; $[a]_D^{26}$ −70.2° (c. 1.1, $H_2O$); UV max. (pH 1) 235 mu ($\epsilon$ 9180) 253 mu sh. ($\epsilon$ 5190), (pH 11) 252 mu ($\epsilon$ 16,900), (MeOH) 252 mu ($\epsilon$ 16,500); NMR (DMSO-$d_6$-$D_2O$) $\delta$ 6.42 (d, 1, $J_{1'-2'}$=5.5 Hz., $H_{1'}$), 5.30 (d, 1, $J_{2'-1'}$=5.5 Hz., $J_{2'-3'}\cong 0$ Hz., $H_{2'}$), 4.38 (broad s, 1, $H_{3'}$), 4.10 (broad t, 1, $J_{4'-5'}$=6.5 Hz., $H_{4'}$), 3.18 (broad d, 2, $J_{5-4}$=6.5 Hz., $H_{5'}$), 4.55 (d, 1, $J_{3-5}$ Hz., $H_3$), 6.00 ("q," 1, $J_{5-3}$=2.5 Hz., $J_{5-6}$=7.5 Hz., $H_5$), 7.71 (d, 1, $J_{6-5}$=7.5 Hz., $H_6$).

*Analysis.*—Calcd. for $C_{10}H_{11}NO_5$ (percent): C, 53.33; H, 4.92; N, 6.22. Found (percent): C, 53.31; H, 4.80; N, 6.21.

The above compound was utilized to form 4-hydroxy-1-B-D-arabinofuranosyl-2-pyridone (12)—A solution of 0.25 gram (0.0011 mole) of 7 in 25 ml. of 0.2 normal NaOH was refluxed for 20 hr., cooled in an ice bath, neutralized to pH≅5 with 1 N HCl (≅4.4 ml.), and evaporated to dryness. The residue was treated with 75 milliliters of warm absolute ethanol filtered, and the filtrate was evaporated to dryness. This second residue was extracted with 40 milliliters of warm ethanol filtered, and the filtrate evaporated to give a solid which was dissolved in 3 ml. of $H_2O$ and applied to a column (1 cm. diameter, 15 ml.) of Dowex 50W–X12 (H) (100–200 mesh) packed in $H_2O$. The column was eluted with $H_2O$ and 4 ml. fractions were collected. Fractions 51 to 90 were pooled and evaporated to dryness and the solid was recrystallized from ethanol acetone to give 0.12 g. (44%) of pure 12; melting point of 168.5–170.5° C.; $[a]_D^{29}$ +164 (c. 0.8, $H_2O$); UV max. (pH 1) 279 mu ($\epsilon$ 3900), (pH 11) 255 mu ($\epsilon$ 8300) 268 mu sh. ($\epsilon$ 6400), ($H_2O$) 280 mu (5000); NMR (DMSO-$d_6$) δ 6.22 (d, 1, $J_{1'-2'}$=4.0 Hz., $H_{1'}$).

Analysis.—Calcd. for $C_{10}H_{13}NO_6$ (percent): C, 49.38; H, 5.39; N, 5.76. Found (percent): C, 49.50; H, 5.44; N, 5.63.

EXAMPLE VIII

Preparation of 4-amino-1-B-D-arabinofuranosyl-2-pyridone commonly called 3-deazacytosine arabinoside, was accomplished by first preparing 4-acetamido-1-(2,3,5-tri-O-benzoyl-B-D-arabinofuranosyl - 2 - pyridone (22). To a solution of 2,3,5-tri-O-benzoyl-D-arabinofuranosyl chloride[14] (17) [from 15.5 g. (0.0272 mole) of 1-O-p-nitrobenzoyl-2,3,5-tri-O-benzyl-D-arabinofuranose] in 150 ml. dichloromethane was added 3.0 g. (0.018 mole) of 13 and 10 g. of 4 A molecular sieves. This mixture was sealed, allowed to stand for 8 days at room temperature, filtered, and the sieves washed well with chloroform. The combined filtrate was evaporated and 50 ml. of ethanol was added to the residual sirup. This solution was heated for 5 min. on the steam bath and evaporated. The resulting sirup was dissolved in 250 milliliters of chloroform and this solution was washed with two 50 milliliter portions of water, two 50 milliliter portions of saturated aqueous sodium bicarbonate, two 50 milliliter portions of $H_2O$, dried magnesium sulfate and evaporated to dryness. The residue was dissolved in 25 ml. of chloroform and applied to a column (1 in. diameter, 220 grams) of silica gel packed in chloroform. The column was eluted with 2400 ml. of chloroform and then 2400 ml. chloroform-acetone (8:2) and 200 ml. fractions were collected. Fractions 14 to 24 were pooled and evaporated to yield 3.67 grams (37%) of 22 as a sirup which was crystallized from benzene-ligroine boiling point 30–60° C. to give needles of 22, melting point 112–113° C.; UV max. (pH 1) 288; 258 mu (5550; 16,360), (pH 11) 292; 258 mu (5820; 16,100), (MeOH) 300; 255 mu (5550; 16,800).

Analysis.—Calcd. for $C_{33}H_{34}N_2O_6$ (percent): C, 71.46; H, 6.18; N, 5.05. Found (percent): C, 71.16; H, 5.99; N, 4.97.

The above compound was utilized to prepare 4-amino-1-B-D-arabinofuransoyl-2-pyridone(3 - deazacytosine arabinoside) (23). A solution of 1.0 gram (0.0018 mole) of 22 in 75 ml. of 0.035 N NaOH in 30% aqueous methanol was refluxed for 4.5 hrs. Methanol was removed by evaporation and the resulting aqueous mixture was extracted four 50 milliliters portions of chloroform. The combined organic phase was washed with 50 milliliters of $H_2O$, dried sodium sulfate and evaporated to dryness to give 0.90 gram (97%) of a yellow solid foam, NMR (DMSO-$d_6$) δ 5.54 (s., 2,4-$NH_2$). This material [1.12 grams (0.00218 mole)] was dissolved in 100 ml. of 50% aqueous ethanol and hydrogenated for 50 hrs. at 50 p.s.i. over 0.56 gram of 10% Pd-C at room temperature. The mixture was filtered using a celite bed, the filter cake was washed with 25 ml. of hot ethanol, and the combined filtrate was evaporated to give 0.68 gram of a solid glass. This material was dissolved in 6.5 milliliters of 50% aqueous methanol and applied to a column (1 cm. diameter, 20 ml.) of Dowex 1–X2 ($OH^-$) (200–400) mesh packed in the same solvent. Elution with 50% aqueous methanol was begun and 4 ml. fractions were collected. Fractions 46 to 110 were pooled and evaporated to give a residue which was crystallized from methanol-ethyl ether to yield 0.20 gram (38%) of needles of 23 melting point 217.5–219.5° C.; $[a]_D^{28}$ +128° (c. 1, $H_2O$); UV max. (pH 1) 258.5 mu ($\epsilon$ 16,700), (pH 11) 258.5 mu ($\epsilon$ 9,570) 275 mu sh. ($\epsilon$ 7,140), (MeOH), 260.5 mu ($\epsilon$ 9,200) 275 mu sh. ($\epsilon$ 6,780), ($H_2O$) 259.5 mu ($\epsilon$ 9,100) 275 mu sh. ($\epsilon$ 6,780); NMR ($D_2O$) 6.23 (d, 1, $J_{1-2}$=5.0 Hz., $H_{1'}$).

Analysis.—Calcd. for $C_{10}H_{14}H_2O_5$ (percent): C, 49.58; H, 5.82, N, 11.57. Found (percent): C, 49.44; H, 5.88; N, 11.30.

In the following table there is presented ultraviolet spectrographic data on novel compounds whose preparation is set forth in the above examples.

TABLE I [a]

| Compound | Max. (mu) | Max. ×10⁻³ | Min. (mu) | Min. ×10⁻³ |
| --- | --- | --- | --- | --- |
| 2,4-dimethoxypridine [b] | 260 | 2.24 | 242 | 0.89 |
| 2-methoxy-4-pyridone [b] | 248 | 11.2 | 225 | 2.82 |
| 4-methoxy-2-pyridone [b] | 276 | 4.47 | 243 | 1.12 |
| 4-hydroxy-1-methyl-2-pyridone [b] | 280 | 3.98 | 247 | 1.00 |
| 3-deazauridine (4) | 281 | 4.74 | 249 | 2.06 |
| 3-methoxy-1-methyl-4-pyridone [b] | 251 | 11.2 | 227 | 2.51 |
| 3-deazauridine-O-2'-cyclonucleosides [3] (7) | 252 | 61.9 | 227 | 2.75 |
| 2-methoxy-4-amino-pyridine | 241:266 sh. | 9.77; 2.09 | 227 | 5.71 |
| 3-deazacytidine (16) | 260:275 sh. | 8.51; 6.46 | 236 | 3.63 |

[a] All spectra determined in 50% aqueous ethanol.
[b] Data taken from H. J. den Hertog and D. J. Buurman, Rec. Trav. Chim. Pays-Bas, 75, 257 (1956).

In the above compounds and table, melting points were determined on a Fisher-Johns block and are uncorrected. NMR (Nuclear Magnetic Resonance) spectra were determined on a Varian A–60 instrument with tetramethylsilane or sodium 5,5-dimethyl-5-silapentanesulfonate as internal standard. Ultraviolet (UV) spectra were determined on a Beckman DK–2 instrument. Hydrogenations were effected using a Parr hydrogenation apparatus at specified hydrogen gas pressure. Evaporations were accomplished using a Buchler rotating evaporator under reduced pressure (aspirator) unless specified otherwise. Optical rotations were determined on a Perkin-Elmer model 141 digital readout polarimeter. Thin layer chromatography (TLC) was run on glass plates coated with SilicAR–7GF Mallinckrodt Chemical Works using chloroform-acetone (8:2) unless otherwise specified.

Biological effects

The following table shows the biological effectiveness of 3-deazauridine and 3-deazacytidine.

TABLE II.—EFFECT OF 3-DEAZA-PYRIMIDINES ON THE GROWTH OF *ESCHERICHIA COLI* AND *STREPTOCCUS FAECALIS*

| Compound | Molar concentration for 50% growth inhibition of— | |
|---|---|---|
| | E. coli | S. faecalis |
| 3-deazauracil | $>10^{-3}$ | $>10^{-3}$ |
| 3-deazacytosine | $>10^{-3}$ | $>10^{-3}$ |
| 3-deazauridine | $4 \times 10^{-4}$ | $2 \times 10^{-4}$ |
| 3-deazacytidine | $3 \times 10^{-7}$ | $2 \times 10^{-4}$ |
| 4-amino-1-(2-deoxy-B-D-erythropentofuranosyl-2-pyridone | $>10^{-3}$ | $2 \times 10^{-4}$ |
| 2'-deoxy-3-deazauridine | $>10^{-3}$ | $6 \times 10^{-4}$ |
| 3-deazacytosine arabinoside | $>10^{-3}$ | $>10^{-3}$ |
| 3-deazauricil arabinoside | | |

NOTE.—Grown in synthetic media free of pyrimidines or purines.

The above data shows that less than about 40% as much 3-deazauridine is required to have the same inhibitive effect with *E. coli* as 3-deazauracil. The effectiveness of 3-deazacytidine is about 30,000 times as great as 3-deazauracil in inhibiting *E. coli* growth.

The magnitude of increased effectiveness in inhibiting growth of *S. faecalis* is about five fold for 3-deazauridine and 3-deazacytidine in comparison to 3-deazauracil and 3-deazacytosine.

Where a designation of $>10^{-3}$ appears in the above table it means that the compound was effective in inhibiting 50% growth when concentrations greater than $10^{-3}$ are used.

TABLE III.—EFFECT OF 3-DEAZA-PYRIMIDINES ON THE GROWTH OF EHRLICH ASCITES CARCINOMA AND LEUKEMIA L-1210 CELLS IN VITRO

| Compound | Molar concentration for 50% growth inhibition of— | |
|---|---|---|
| | Ehrlich ascites | L-1210 |
| 3-deazauridine | $5 \times 10^{-6}$ | $6 \times 10^{-6}$ |
| 3-deazacytidine | $3 \times 10^{-5}$ | $5 \times 10^{-5}$ |

NOTE.—Grown in a synthetic medium containing 5% fetal calf serum.

TABLE IV.—EFFECT OF 3-DEAZA-PYRIMIDINES ON EHRLICH ASCITES CARCINOMA IN MALE HA/ICR SWISS MICE*

| Treatment (mg./kg./day) | Average number of cells ×10⁶/ mouse on 7th day of inoculation | Average change in body weight, gm., on 7th day of inoculation | Mortality |
|---|---|---|---|
| Saline | 314 | 3.5 | 0 |
| 3-deazacytidine: | | | |
| 20 | 263 | 3.3 | 0 |
| 40 | 130 | 1.5 | 0 |
| 60 | 105 | 1.0 | 0 |
| 3-deazauridine: | | | |
| 20 | 118 | 2.0 | 0 |
| 40 | 90 | 1.3 | 0 |
| 60 | 65 | 1.0 | 0 |

*1×10⁶ carcinoma cells were inoculated intraperitoneally and treatment was given intraperitoneally once a day for 6 days starting the day after implantation. The second column shows the increased multiplication of cancer cells by the seventh day. The total dosage of antibiotic given a particular mouse may be obtained by multiplying the appropriate figure in column 1 by six.

TABLE V.—EFFECT OF 3-DEAZA-PYRIMIDINES ON LEUKEMIA L-1210 IN MALE DBA/2 HA-DD MICE*

| Treatment (mg./kg./day) | Survival time | | |
|---|---|---|---|
| | Average days | Range | Percent increase (T/C) |
| Saline | 9.6 | 9–10 | |
| 3-deazacytidine: | | | |
| 50 | 11.4 | 9–12 | 119 |
| 100 | 12.6 | 9–16 | 131 |
| 150 | 13.2 | 10–21 | 138 |
| 3-deazauridine: | | | |
| 50 | 13.5 | 12–15 | 141 |
| 100 | 17.5 | 14–21 | 182 |
| 150 | 21.5 | 18–28 | 223 |

*1×10⁵ cells were inoculated intraperitoneally and treatment was given intraperitoneally once a day for 6 days starting the day after implantation. The second column shows the number of days a particular mouse survived after treatment began.

We claim:
1. 3-deazapyrimidine nucleosides having the structure

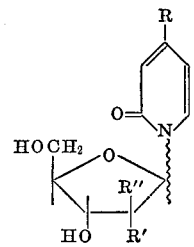

wherein R is a group selected from the class consisting of hydroxyl and amine (—NH₂) and R' and R" are selected from the class consisting of hydrogen and hydroxyl.

2. The 3-deazapyrimidine nucleoside of claim 1 wherein R is hydroxyl.

3. The 3-deazapyrimidine nucleoside of claim 1 wherein R is amine (—NH₂).

4. The 3-deazapyrimidine nucleoside of claim 1 wherein R' and R" are hydrogen.

5. The 3-deazapyrimidine nucleoside of claim 1 wherein the structure is

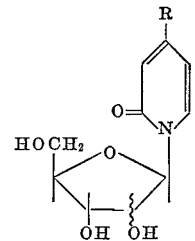

wherein R is selected from the group consisting of hydroxyl and amine (—NH₂).

6. The 3-deazapyrimidine nucleoside of claim 5 having the structure

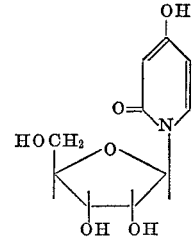

identified as 3-deazauridine.

7. The 3-deazapyrimidine nucleoside of claim 5 having the structure

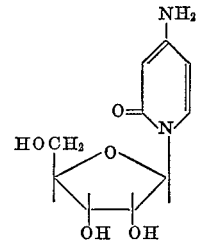

identified as 3-deazacytidine.

References Cited

UNITED STATES PATENTS

| | | | |
|---|---|---|---|
| 2,146,899 | 2/1939 | Karrer | 260—211.5 |
| 2,637,727 | 5/1953 | Hodge | 260—211.5 |
| 3,208,997 | 9/1965 | Iwai et al. | 260—211.5 |
| 3,346,561 | 10/1967 | Boxer et al. | 260—211.5 |
| 3,352,849 | 11/1967 | Shen et al. | 260—211.5 |
| 3,354,160 | 11/1967 | Duschinsky et al. | 260—211.5 |
| 3,520,872 | 7/1970 | Wechter et al. | 260—211.5 R |

LEWIS GOTTS, Primary Examiner

J. R. BROWN, Assistant Examiner

U.S. Cl. X.R.

424—180